US007594308B2

(12) United States Patent
Sugahara

(10) Patent No.: US 7,594,308 B2
(45) Date of Patent: Sep. 29, 2009

(54) METHOD FOR PRODUCING A PIEZOELECTRIC ACTUATOR AND A LIQUID TRANSPORTING APPARATUS

(75) Inventor: Hiroto Sugahara, Aichi-ken (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 649 days.

(21) Appl. No.: 11/261,300

(22) Filed: Oct. 27, 2005

(65) Prior Publication Data

US 2006/0117563 A1 Jun. 8, 2006

(30) Foreign Application Priority Data

Oct. 28, 2004 (JP) ............................. 2004-313802

(51) Int. Cl.
*H04R 17/00* (2006.01)

(52) U.S. Cl. ....................... 29/25.35; 29/890.1; 29/593; 347/70; 347/71

(58) Field of Classification Search ................ 29/25.35, 29/890.1, 593; 438/21, 53; 347/68, 70, 71
See application file for complete search history.

(56) References Cited

U.S. PATENT DOCUMENTS

| | | | | |
|---|---|---|---|---|
| 6,347,862 | B1 | 2/2002 | Kanno et al. | |
| 6,551,851 | B2 * | 4/2003 | Gamble et al. | 438/53 |
| 2004/0223035 | A1 | 11/2004 | Hirota | |

FOREIGN PATENT DOCUMENTS

| | | | |
|---|---|---|---|
| JP | 59023612 A * | 2/1984 | 29/25.35 |
| JP | 10-286953 | 10/1998 | |
| JP | 2003-142750 | 5/2003 | |
| JP | 2004-284109 | 10/2004 | |

* cited by examiner

*Primary Examiner*—A. Dexter Tugbang
(74) *Attorney, Agent, or Firm*—Reed Smith LLP

(57) ABSTRACT

A method for manufacturing a piezoelectric actuator includes the steps of measuring a thickness of a vibration plate and determining a thickness of a piezoelectric layer based on an amount of deviation in the measured thickness of the vibration plate from a preset reference thickness of the vibration plate. Then, a piezoelectric layer of the determined thickness is formed on a side of the vibration plate which is opposite to a pressure chamber. This makes it easy to correct the thickness of the vibration plate with the thickness of the piezoelectric layer. It is easy to mass-produce piezoelectric actuators having constant and desired characteristics.

19 Claims, 12 Drawing Sheets

METHOD FOR PRODUCING A PIEZOELECTRIC ACTUATOR AND A LIQUID TRANSPORTING APPARATUS

BACKGROUND OF THE INVENTION

1. Field of the Invention

The present invention relates to a method for producing a piezoelectric actuator for a liquid transporting apparatus, a method for producing a liquid transporting apparatus, and an apparatus for producing a piezoelectric actuator.

2. Description of Related Art

A liquid transporting apparatus such as an ink-jet head, which discharges ink through its nozzle, has an actuator which exerts pressure on liquid to transport the liquid. Actuators for liquid transporting apparatuses vary in structure, and among others a piezoelectric actuator is widely used which has a piezoelectric layer formed of a ferroelectric piezoelectric material such as lead zirconate titanate (PZT), and in which, when an electric field acts on the piezoelectric layer, the piezoelectric layer deforms to drive an object. For example, a piezoelectric actuator for an ink-jet head generally has a pressure chamber, a vibration plate, a piezoelectric layer and two electrodes. The pressure chambers contain ink and are covered by one side of the vibration plate. The piezoelectric layer is arranged on the other side of the vibration plate. Each of the electrodes is arranged on one side of the piezoelectric layer.

For example, a piezoelectric layer of relatively uniform thickness can be formed by an aerosol deposition (AD) method (see, for example, Japanese Patent Application Laid-open No. 2003-142750) or a sputtering method (see, for example, U.S. Pat. No. 6,347,862 and the corresponding Japanese Patent Application Laid-open No. 10-286953). The aerosol deposition method is a method for blowing very small particles of piezoelectric material mixed with a carrier gas onto a substrate so that the mixture impinges at a high velocity and is deposited on the substrate. The sputtering method is a method for ionizing argon or the like and forcing it to be impinged on a target so that particles of the target are deposited on a substrate. Alternatively, a piezoelectric layer can be formed by joining, to a vibration plate, a piezoelectric sheet obtained by burning (calcining) a green sheet of PZT or the like (see, for example, U.S. Patent Application Publication No. 2004/0223035 and the corresponding Japanese Patent Application Laid-open No. 2004-284109).

In the piezoelectric actuator, when drive voltage is applied to one of the two electrodes, an electric field acts through the piezoelectric layer sandwiched between the electrodes, so that the layer expands in a direction of thickness of the piezoelectric layer and contracts in a direction parallel to a plane of the piezoelectric layer. The deformation of the piezoelectric layer results in the deformation of the vibration plate, therefore a volume of the pressure chamber changes, thereby applying a pressure to the ink in the pressure chamber.

When the vibration plates of actuators are formed of a metallic material, there may be a case in which vibration plates made of metallic sheets are slightly different in thickness per every lot of vibration plate. This results in the vibration plate varying in thickness for each actuator. Consequently, when the thickness of the vibration plates vary, the actuators have various characteristics even if piezoelectric layers of equal thickness can be formed for the actuators by the AD method, the sputtering method or another method, or by using piezoelectric sheets of equal thickness. The actuator characteristics include the deformation of each vibration plate and the rigidity of each piezoelectric actuator. Consequently, the various characteristics among the actuators cause the heads to discharge ink droplets in various volumes at various velocities through their nozzles. This results in the printing quality being uneven, so that the yield lowers.

Conceivably, the variation in thickness among the vibration plates can be corrected by adjusting, for each of the heads, conditions such as, the drive voltage, the drive waveform, for the drive signal supplied to an electrode of each of the heads. However, it is troublesome to correct these conditions for each of the heads, and the correction may be difficult depending on the specifications or the like for the driving units which apply drive voltage to electrodes.

SUMMARY OF THE INVENTION

An object of the present invention is to provide a method for manufacturing a piezoelectric actuator which is capable of correcting, with the thickness of the piezoelectric layer, the variation in thickness among vibration plates; a method for manufacturing a liquid transporting apparatus, and an apparatus for manufacturing such a piezoelectric actuator. The present invention also provides a method for manufacturing a piezoelectric actuator which makes it easy to mass-produce piezoelectric actuators having constant and desired ejection characteristics even if the vibration plates as parts of the actuators vary in thickness.

According to a first aspect of the present invention, there is provided a method for manufacturing a piezoelectric actuator for a liquid transporting apparatus, the piezoelectric actuator being provided on a surface of a channel unit having a pressure chamber, the piezoelectric actuator including a vibration plate covering the pressure chamber, a piezoelectric layer positioned on a side of the vibration plate which is opposite to the pressure chamber, and two electrodes positioned on both sides of the piezoelectric layer respectively to sandwich the piezoelectric layer therebetween, the method including: a vibration plate thickness measuring step for measuring a thickness of the vibration plate; a piezoelectric layer thickness determining step for determining a thickness of the piezoelectric layer based on an amount of deviation in the thickness of the vibration plate, measured in the vibration plate thickness measuring step, from a preset reference thickness of the vibration plate; and a piezoelectric layer forming step for providing the piezoelectric layer of the thickness determined in the piezoelectric layer thickness determining step on the side of the vibration plate which is opposite to the pressure chamber.

When the vibration plates of piezoelectric actuators vary in thickness among the actuators, the plates vary in amount of deformation, and the actuators vary in rigidity and the like. The amount of deformation of the vibration plates and the rigidity and the like of the piezoelectric actuators influence the amount of liquid transported by liquid transporting apparatuses, the velocity at which the liquid is transported by the liquid transporting apparatuses, and the like. However, the present invention includes determining an appropriate thickness of the piezoelectric layer based on an amount of deviation in the actually measured thickness of the vibration plate from a reference thickness of the vibration plate, and providing the piezoelectric layer of the determined thickness on the side of the vibration plate which is opposite to the pressure chamber. Accordingly, when the thickness of the vibration plate deviates from the reference thickness, it is easy to correct the deviation with the thickness of the piezoelectric layer. This improves the yield in the manufacturing method. In an embodiment of the present invention, the two electrodes are formed separately from the vibration plate. In another embodiment, the vibration plate is formed of an electrically conductive material and serves as one of the two electrodes.

In the piezoelectric layer thickness determining step of the method for manufacturing the piezoelectric actuator according to the present invention, the thickness of the piezoelectric layer may be determined so that an amount of deformation of the vibration plate when a preset voltage is applied to one of the electrodes is a preset amount of deformation. When the vibration plates of piezoelectric actuators vary in thickness among the piezoelectric actuators, the plates vary in deformation. The amount of deformation of the vibration plates influences the amount of liquid transportation. However, the present invention makes it possible to correct the thickness variation among the vibration plates by determining the thickness of the piezoelectric layer so that the amount of deformation of the vibration plate is the preset amount of deformation. This enables the vibration plates of piezoelectric actuators to be equal in amount of deformation among the piezoelectric actuators.

In the present invention, the vibration plate may be made of a material having an elastic modulus equal to or higher than that of a material for the piezoelectric layer; and when an amount of deviation in the thickness of the vibration plate is $\Delta Tv$ and a correction amount with respect to a preset reference thickness of the piezoelectric layer is $\Delta Tp\mathbf{1}$, the correction value $\Delta Tp\mathbf{1}$ may be determined in the piezoelectric layer thickness determining step within a range represented by the following expression (1):

$$(-0.75\times\Delta Tv)\leqq\Delta Tp1\leqq(-1.05\times\Delta Tv) \tag{1}$$

In this case, it is easy to determine the thickness of the piezoelectric layer with which the amount of deformation of the vibration plate is the preset amount of deformation.

In the piezoelectric layer thickness determining step of the method for manufacturing the piezoelectric actuator according to the present invention, the thickness of the piezoelectric layer may be determined so that a rigidity of the actuator is a preset value. The rigidity of the actuator influences the velocity of liquid transportation and the velocity of propagation of the pressure wave generated in the pressure chamber when drive voltage is applied to the individual electrode. When the vibration plates of a plurality of actuators vary in thickness among the actuators, the actuators vary in rigidity. The present invention makes it possible to correct the thickness variation among the vibration plates by determining the thickness of the piezoelectric layer so that the rigidity of the actuator is the preset value. This enables the actuators to be equal in rigidity.

In the present invention, the vibration plate may be made of a material having an elastic modulus equal to or higher than that of a material for the piezoelectric layer; and when the amount of deviation in the thickness of the vibration plate is $\Delta Tv$ and a correction amount with respect to a preset reference thickness of the piezoelectric layer is $\Delta Tp\mathbf{2}$, the correction amount $\Delta Tp\mathbf{2}$ may be determined in the piezoelectric layer thickness determining step within a range represented by the following expression (2):

$$(-1.0\times\Delta Tv)\leqq\Delta Tp2\leqq(-1.3\times\Delta Tv) \tag{2}$$

In this case, it is easy to determine the thickness of the piezoelectric layer with which the rigidity of the actuator is the preset value. In consideration of the expression (2) with respect to the expression (1), it is advantageous in terms of manufacture to determine, in the piezoelectric layer thickness determining step, the correction value $\Delta Tp\mathbf{1}$ within a range represented by the following expression (3):

$$(-1.0\times\Delta Tv)\leqq\Delta Tp1\leqq(-1.05\times\Delta Tv) \tag{3}$$

In the method for manufacturing a piezoelectric actuator according to the present invention, the vibration plate may be formed of an electrically conductive material and may serve as one of the two electrodes; in the piezoelectric layer forming step, the piezoelectric layer may be formed to make contact with a surface of the vibration plate which is opposite to the pressure chamber; and the other of the two electrodes may be formed to make contact with a surface of the piezoelectric layer which is opposite to the vibration plate. In such a manner, the piezoelectric layer is formed directly on the surface of the vibration plate which is opposite to the pressure chamber, without another layer (for example, an electrode layer or an insulation material layer which insulates the electrode and the vibration plate from each other) intervening between the piezoelectric layer and the vibration plate. This makes it possible to accurately correct the thickness variation among vibration plates by adjusting the thickness of the piezoelectric layer. In addition, the vibration plate serves as one of the two electrodes. This makes it possible to omit the step of forming the one of the electrodes separately from the vibration plate. The omission simplifies the manufacturing process.

In the piezoelectric layer forming step of the method for manufacturing the piezoelectric actuator according to the present invention, the piezoelectric layer may be formed on the vibration plate by an aerosol deposition method, a sputtering method or a chemical vapor deposition method. The use of such a method makes it easy to form the piezoelectric layer of the thickness determined in the piezoelectric layer forming step. In terms of manufacture, the aerosol deposition method is preferable among these methods. The piezoelectric layer may also be formed, other than being formed on the vibration plate, by sticking a material which has been formed into a sheet in advance on the vibration plate.

According to a second aspect of the present invention, there is provided a method for manufacturing a piezoelectric actuator to be provided on a surface of a channel unit having a pressure chamber, the piezoelectric actuator including a vibration plate covering the pressure chamber, a piezoelectric layer positioned on a side of the vibration plate which is opposite to the pressure chamber, and two electrodes positioned on both sides of the piezoelectric layer respectively to sandwich the layer therebetween, the vibration plate being made of a material having an elastic modulus equal to or higher than that of a material for the piezoelectric layer, the method including: a step for obtaining a sum of a design value for a thickness of the vibration plate and a design value for a thickness of the piezoelectric layer; a measuring step for measuring the thickness of the vibration plate; a step for determining the thickness of the piezoelectric layer so that the sum is maintained with respect to the measured thickness of the vibration plate; and a piezoelectric layer forming step for providing the piezoelectric layer of the determined thickness on the side of the vibration plate which is opposite to the pressure chamber. This method makes it possible to adjust the thickness of the piezoelectric layer by the error from the design value for the vibration plate so that the sum of the measured thicknesses of the vibration plate and the piezoelectric layer can be kept constant. This makes the thickness adjustment, particularly the piezoelectric layer thickness setting step, very easy.

According to a third aspect of the present invention, there is provided a method for manufacturing a liquid transporting apparatus provided with a channel unit having a pressure chamber and a piezoelectric actuator which is provided on a surface of the channel unit and which includes a vibration plate covering the pressure chamber, a piezoelectric layer positioned on a side of the vibration plate which is opposite to the pressure chamber, and two electrodes positioned on both sides of the piezoelectric layer respectively, the method including: a vibration plate thickness measuring step for measuring a thickness of the vibration plate; a piezoelectric layer thickness determining step for determining a thickness of the piezoelectric layer based on an amount of deviation in the thickness of the vibration plate, measured in the vibration plate thickness measuring step, from a preset reference thickness of the vibration plate; and a piezoelectric layer forming step for providing the piezoelectric layer of the thickness determined in the piezoelectric layer thickness determining step on the side of the vibration plate which is opposite to the pressure chamber.

According to this method for manufacturing the liquid transporting apparatus, even when the thickness of the vibration plate deviates from the reference thickness, it is possible to correct the deviation with the thickness of the piezoelectric layer. This improves the yield in the manufacturing process. It is also possible to minimize the variation in amount of deformation among the vibration plates of piezoelectric actuators, the variation in rigidity among the actuators and/or other variation among the actuators. This enables liquid transporting apparatuses to transport the liquid in an equal amount, at an equal velocity etc.

According to a fourth aspect of the present invention, there is provided an apparatus for manufacturing a piezoelectric actuator for a liquid transporting apparatus, the piezoelectric actuator being provided on a surface of a channel unit having a pressure chamber, the piezoelectric actuator including a vibration plate covering the pressure chamber, a piezoelectric layer positioned on a side of the vibration plate opposite to the pressure chamber, and two electrodes positioned on both sides of the piezoelectric layer respectively, the apparatus for manufacturing the piezoelectric actuator including: a thickness measuring unit which measures a thickness of the vibration plate; a thickness determining unit which determines a thickness of the piezoelectric layer based on an amount of deviation in the thickness of the vibration plate measured by the thickness measuring unit from a preset reference thickness of the vibration plate; and a piezoelectric layer forming unit which forms the piezoelectric layer of the thickness determined by thickness determining unit on the side of the vibration plate which is opposite to the pressure chamber.

According to this apparatus for manufacturing the piezoelectric actuator, even when the thickness of the vibration plate deviates from the reference thickness, it is possible to correct the deviation with the thickness of the piezoelectric layer. This improves the yield in the manufacturing process. It is also possible to suppress as much as possible the variation in amount of deformation among the vibration plates of piezoelectric actuators, the variation in rigidity among the actuators and/or other variation among the actuators. The apparatus for manufacturing the piezoelectric actuator may further include a storage unit which stores a relationship between the thickness of the piezoelectric layer and the amount of deviation in the thickness of the vibration plate from the reference thicknesses of the vibration plate.

PREFERRED EMBODIMENTS OF THE INVENTION

An explanation will be provided of an embodiment of the present invention. The embodiment is an example of the application of the present invention to an ink-jet head, as a liquid transporting apparatus, which discharges ink through its nozzles onto recording paper.

Figure 1:
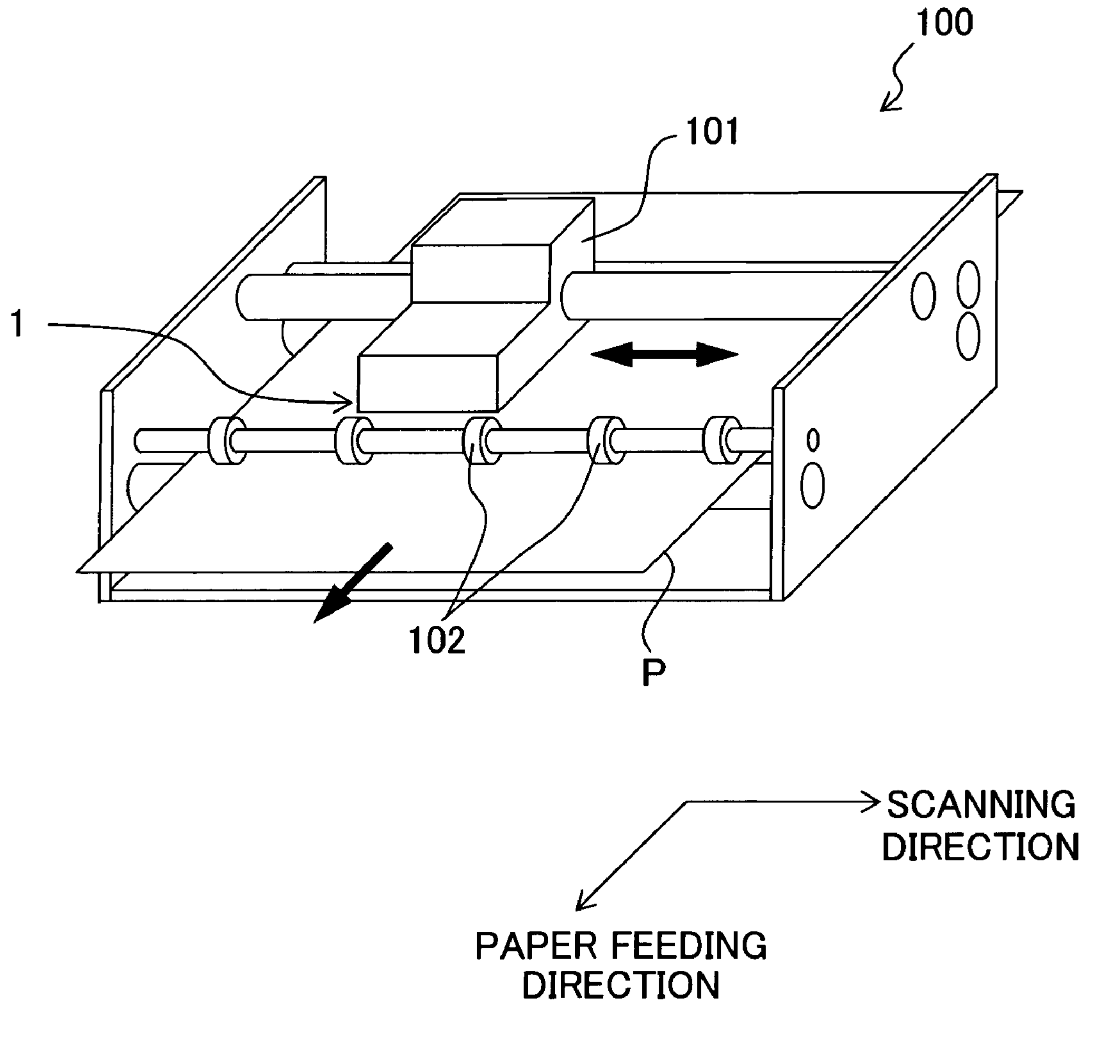
FIG. 1 is a schematic perspective view of an ink-jet head according to an embodiment of the present invention.
Figure 2:
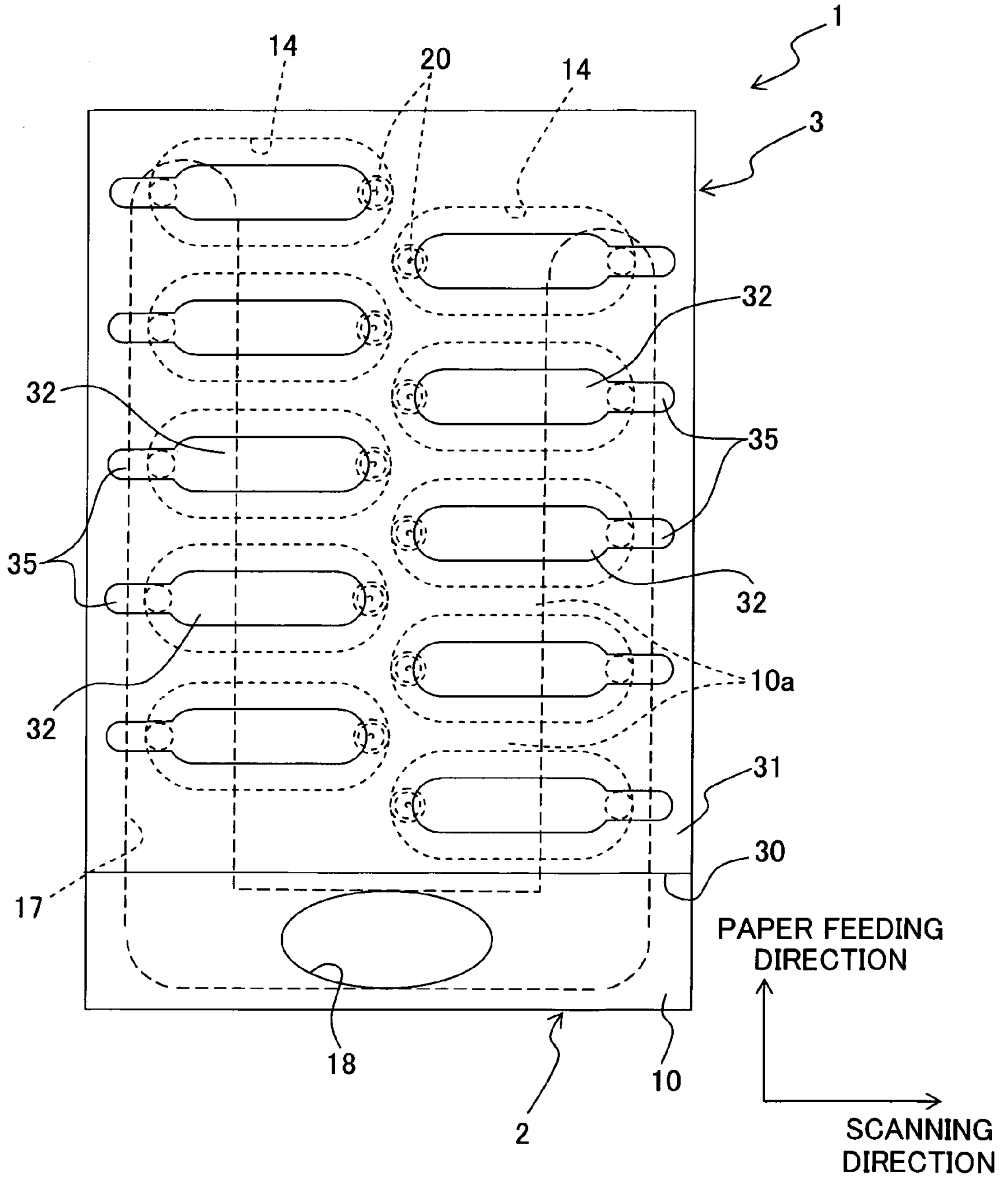
FIG. 2 is a plan view of the ink-jet head.

First, a brief explanation will be provided below of an ink-jet printer 100 provided with an ink-jet head 1. As shown in FIG. 1, the ink-jet printer 100 is provided in a carriage 101, a serial ink-jet head 1, feed rollers 102, and the like. The carriage 101 is movable in a right and left direction in FIG. 1 and carries the ink-jet head 1, which discharges ink onto recording paper P. The feed rollers 102 feed a recording paper P in a forward direction in FIG. 1. The ink-jet head 1 moves integrally with the carriage 101 in a right and left direction (in a scanning direction). The ink-jet head 1 has nozzles 20 (see FIGS. 2 to 5) formed through its ink discharge surface on its lower side and ejects ink through the ejection ports of the nozzles 20 onto the recording paper P. The recording paper P on which an image or the like has been recorded by the ink-jet head 1 is discharged in the forward direction (in a paper feeding direction) by the feed rollers 102.

Next, a detailed explanation will be provided below of the ink-jet head 1 with reference to FIGS. 2 to 5.

As shown in FIGS. 2 to 5, the ink-jet head 1 includes a channel unit 2 and a piezoelectric actuator 3 which is stacked on an upper surface of the channel unit 2. The channel unit 2 has individual ink channels 21 (see FIG. 4) which are formed therein and which include pressure chambers 14.

Figure 4:
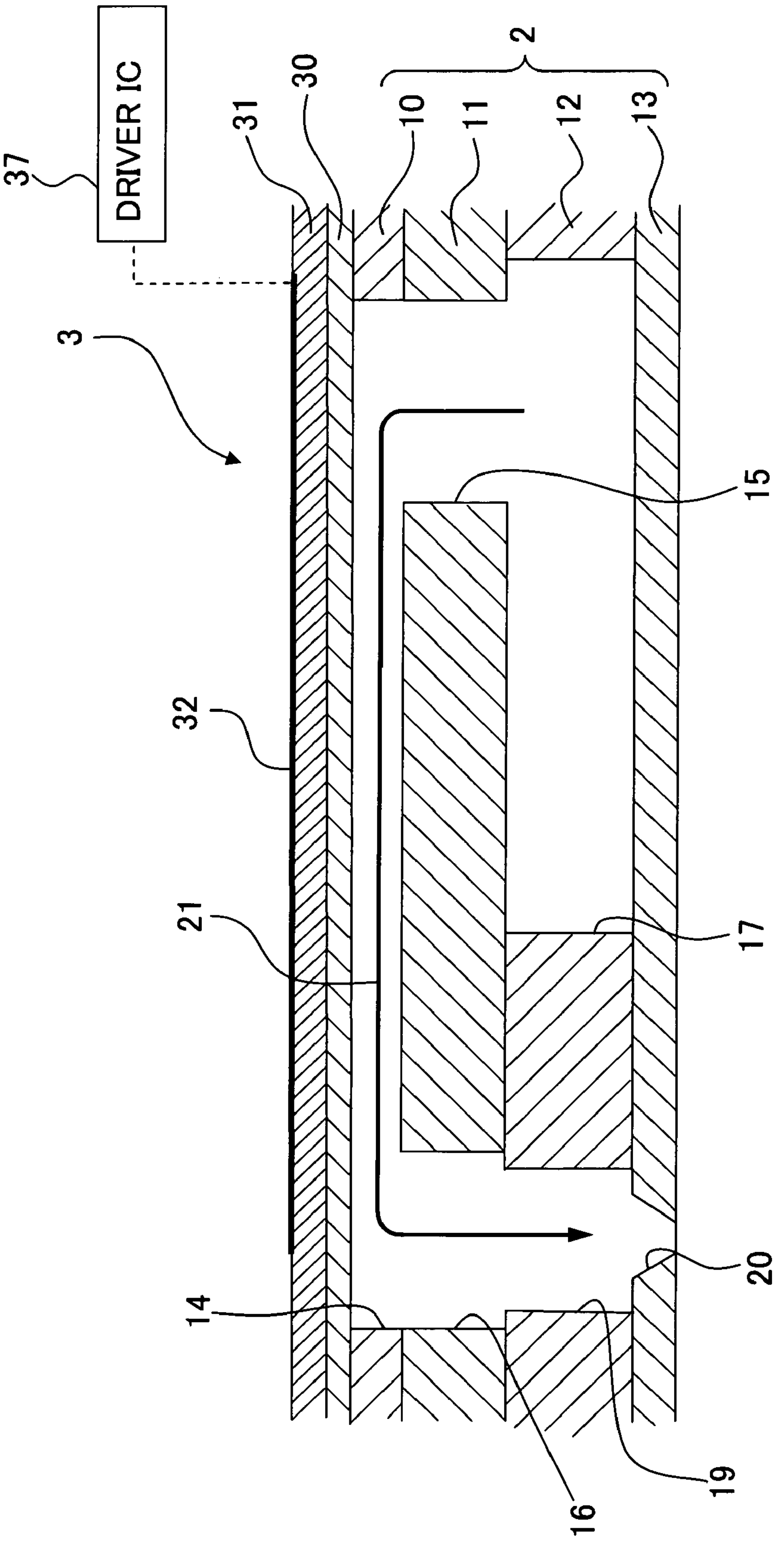
FIG. 4 is a sectional view taken along line IV-IV in FIG. 3.
Figure 5:
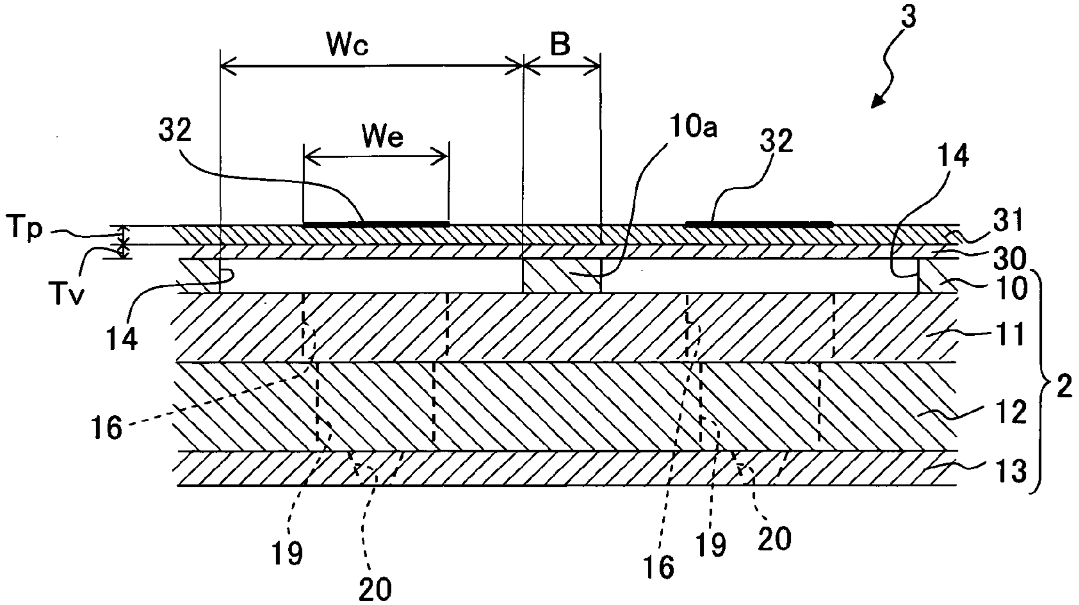
FIG. 5 is a sectional view taken along line V-V in FIG. 3.

First, the channel unit 2 will be explained below. As shown in FIGS. 4 and 5, the channel unit 2 includes a cavity plate 10, a base plate 11, a manifold plate 12 and a nozzle plate 13, which are bonded together in the form of a laminate. Among these plates, the cavity plate 10, the base plate 11 and the manifold plate 12 are stainless steel plates. Ink channels such as the pressure chambers 14 and a manifold 17, which will be described later on, can be easily formed by etching through the three plates 10 to 12. The nozzle plate 13 may be formed of a high-molecular synthetic resin such as polyimide and is bonded to the lower surface of the manifold plate 12. Alternatively, the nozzle plate 13 may be formed of stainless steel or other metallic material, as is the case with the three plates 10 to 12.

As shown in FIGS. 2 to 5, the cavity plate 10 has pressure chambers 14 formed therethrough and arrayed along a plane. The pressure chambers 14 are open toward a vibration plate 30 (upward in FIG. 4), which will be described later on. The pressure chambers 14 are arrayed in two rows extending in the paper feeding direction (up and down direction in FIG. 2). The pressure chambers 14 are formed to have a shape elongated in the scanning direction (right and left direction in FIG. 2) in a plan view and substantially elliptic. The cavity plate 10 also has an ink supply port 18 which is formed therethrough and which communicates with an ink tank (not shown).

Figure 3:
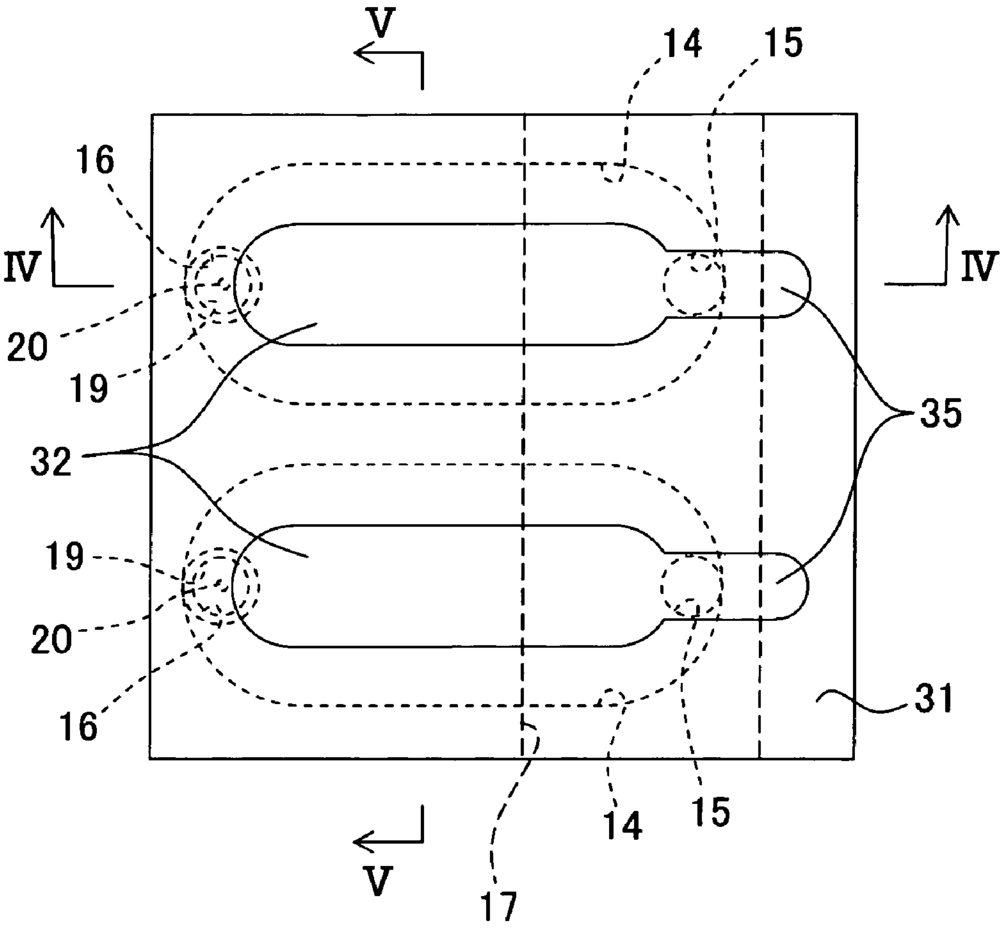
FIG. 3 is a partially enlarged view of FIG. 2.

As shown in FIGS. 3 and 4, the base plate 11 has communication holes 15 and 16 formed therethrough at positions overlapping with both end portions of one of the pressure chambers 14 respectively. The manifold plate 12 has a manifold 17 formed therethrough and extending in the paper feeding direction (up and down in FIG. 2). The manifold 17 overlaps in a plan view with the right or left end portion of each of the pressure chambers 14 in FIG. 2. The manifold 17 is supplied with ink from the ink tank through the ink supply port 18. The manifold plate 12 also has communication holes 19 formed therethrough and overlapping in a plan view with the end portions of the pressure chambers 14 respectively at the side opposite to the manifold 17. The nozzle plate 13 has a plurality of nozzles 20 formed therethrough, at positions overlapping with the communication holes 19 respectively. The nozzles 20 are formed through a substrate of a high-molecular synthetic resin such as polyimide by means of excimer laser processing.

As shown in FIG. 4, the manifold 17 communicates with the pressure chambers 14 through the communication holes 15, and the pressure chambers 14 communicate with the nozzles 20 through the communication holes 16 and 19. Thus, the individual ink channels 21 from the manifold 17 to the nozzles 20 via the pressure chambers 14 are formed in the channel unit 2.

Next, the piezoelectric actuator 3 will be explained below. As shown in FIGS. 2 to 5, the piezoelectric actuator 3 includes an electrically conductive vibration plate 30, a piezoelectric layer 31 and a plurality of individual electrodes 32. The vibration plate 30 is arranged on the upper surface of the channel unit 2. The piezoelectric layer 31 is formed on the upper surface (surface opposite to the pressure chambers 14) of the vibration plate 30. The individual electrodes 32 are formed on the upper surface of the piezoelectric layer 31 corresponding to the pressure chambers 14 respectively.

The vibration plate 30 is substantially rectangular in plan view and formed of metallic material including an iron alloy such as stainless steel, a copper alloy, a nickel alloy or a titanium alloy. The vibration plate 30 is stacked on and is joined to the upper surface of the cavity plate 10 to cover the pressure chambers 14. The vibration plate 30 serves also as a common electrode, which faces the individual electrodes 32 to cause an electric field act on the portion of the piezoelectric layer 31 which is disposed between each individual electrode 32 and the vibration plate 30.

The piezoelectric layer 31 is formed directly on the upper surface of the vibration plate 30. The principal component of the piezoelectric layer 31 is lead zirconate titanate (PZT), which is a ferroelectric solid solution of lead zirconate and lead titanate. The piezoelectric layer 31 is formed entirely on the upper surface of the vibration plate 30 over the pressure chambers 14. As will be described later on, in order that the thickness variation among vibration plates 30 is corrected with the thickness of the piezoelectric layer 31, the thickness of the piezoelectric layer 31 is determined based on an amount of deviation, from a preset reference thickness, of the thickness of the vibration plate 30 which is measured actually in a process of manufacturing the ink-jet head 1.

The individual electrodes 32 are formed on the upper surface of the piezoelectric layer 31 at positions respectively overlapping with a central portion of the associated pressure chamber 14. The individual electrodes 32 are one size smaller than the pressure chambers 14 and elliptic in plan view. The individual electrodes 32 are formed an electrically conductive material such as gold, copper, silver, palladium, platinum, titanium. A plurality of terminals 35 are formed on the upper surface of the piezoelectric layer 31. Each of the terminals 35 extends in the scanning directions from an end portion of one of the electrodes 32, the end portion being positioned at the side of the manifold 17. As shown in FIG. 4, the terminals 35 are connected electrically to a driver IC 37 via a flexible wiring member (not shown) such as a flexible printed wiring board so that drive voltage is supplied from the IC 37 selectively to the individual electrodes 32 through the terminals 35 respectively.

Next, the operation of the piezoelectric actuator 3 will be explained below.

When drive voltage is applied from the driver IC 37 selectively to the plurality of individual electrodes 32, a potential difference is generated between the individual electrodes 32 which are disposed on the upper surface of the piezoelectric layer 31 and to which the drive voltage is applied and the vibration plate 30, as the common electrode, which is disposed on the lower surface of the piezoelectric layer 31 and is kept at ground potential. As a result, an electric field in a vertical direction is generated in portions of the piezoelectric layer 31 sandwiched between these individual electrodes 32 and the vibration plate 30. Consequently, the portions of the piezoelectric layer 31 which are positioned directly below these individual electrodes 32 contract in a horizontal direction which is a direction perpendicular to a vertical direction in which the piezoelectric layer 31 is polarized. At this time, the vibration plate 30 deforms to project toward the pressure chambers 14 accompanying with the contraction of the piezoelectric layer 31, which in turn reduces the volume of the pressure chambers 14, thereby applying a pressure to the ink in the chambers 14. The pressure discharges ink droplets through the nozzles 20 communicating with the pressure chambers 14.

Next, a method for manufacturing the ink-jet head 1 will be described below.

Figure 6A:
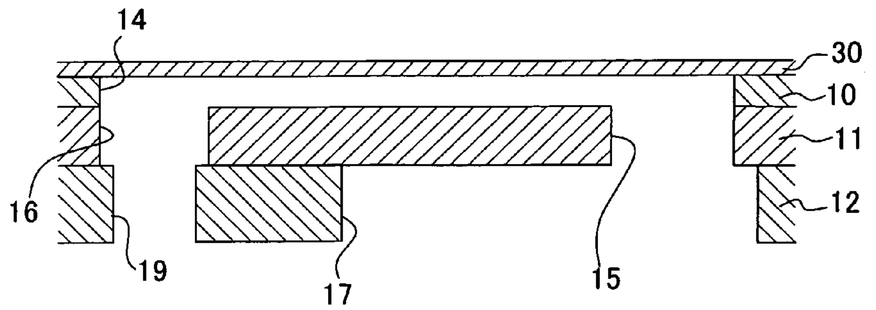
FIG. 6A shows a step of joining metallic plates.

First, holes which are to be the pressure chambers 14, manifold 17 and the like are formed through the cavity plate 10, base plate 11 and manifold plate 12, which are formed of a metallic material, by means of etching or the like. The vibration plate 30 is formed by cutting a metallic sheet into plates of a preset size. Then, as shown in FIG. 6A, the four metallic plates, namely, the cavity plate 10, the base plate 11, the manifold plate 12 and the vibration plate 30, are joined together.

Figure 6B:
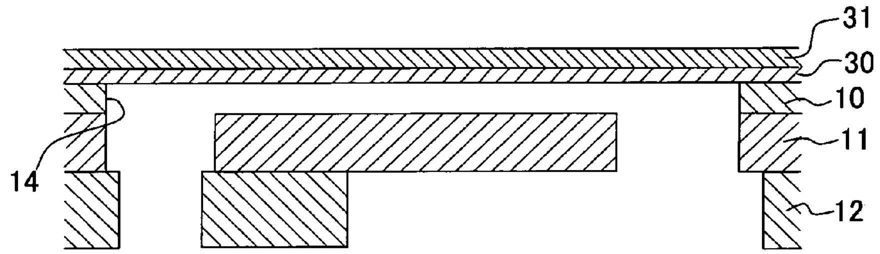
FIG. 6B shows a step of forming a piezoelectric layer.

Next, as shown in FIG. 6B, the piezoelectric layer 31 is formed on the surface of the vibration plate 30 which is opposite to the pressure chambers 14. There is a case in which the vibration plates 30 of piezoelectric actuators 3 vary in thickness for the reason that the plates 30 are cut from different lots of metallic sheets which vary in thickness, or for another reason. In this case, the vibration plates 30 vary in amount of deformation, and the rigidity or the like of the piezoelectric actuators 3 vary among the actuators. This results in ink-jet heads 1 having ink ejection characteristics which vary among the ink-jet heads, thereby causing uneven printing quality among the ink-jet heads. The ejection characteristics include the volume of ink droplets discharged through the nozzles 20, the velocity at which the droplets are discharged through the nozzles, and the ejection timing and the like. Therefore, in order that a plurality of ink-jet heads 1 to have equal ink ejection characteristics, in this embodiment, the thickness variation is corrected among the vibration plates 30 with the thickness of the piezoelectric layers 31 as follows.

First, the thicknesses of the vibration plates 30 cut from a metallic sheet are measured (vibration plate thickness measuring step). The thickness may be measured for each of the vibration plates 30. Alternatively, since there are many cases in which the metallic sheets in each lot are roughly equal in thickness, the thicknesses of the vibration plates 30 may be measured every time a new lot of metallic sheets (mill roll) is used. The thickness of a metallic sheet may be measured before the sheet is cut into vibration plates 30 (in other words, before a vibration plate 30 is joined to a cavity plate 10).

Then, the thickness of the piezoelectric layer 31 is determined based on an amount of deviation in the measured thickness of the vibration plate 30 from a preset reference thickness of a vibration plate 30 (piezoelectric layer thickness determining step). The thickness of the piezoelectric layer 31 which is determined in the piezoelectric layer thickness determining step differs depending on which of the factors which influence ink ejection characteristics is given particular attention.

When the vibration plates 30 of ink-jet heads 1 vary in thickness, the plates 30 also vary in amount of deformation, so that pressures generated in the pressure chambers 14 of the ink-jet heads 1 become various among the ink-jet heads 1. This causes the ink-jet heads 1 to discharge ink droplets of various volumes at various velocities through their nozzles 20, resulting in uneven printing quality among the ink-jet heads 1. Accordingly, it is possible to determine the thickness of the piezoelectric layer 31 in the piezoelectric layer thickness determining step so that the amount of deformation of the vibration plate 30 when a preset drive voltage is applied from a driver IC 37 to individual electrodes 32 is a preset amount of deformation. In this case, a relationship among a thickness Tv of the vibration plate 30, an amount of displacement Dd (hereinafter referred to as a maximum amount of displacement Dd) at a position of the vibration plate 30 which faces a central portion of one of the pressure chambers 14, and a thickness Tp of the piezoelectric layer 31 is obtained in advance by means of a structural analysis according to the finite element method (FEM), or by experiment. For example, in FIG. 5, when a width Wc of the pressure chamber 14 is 250 μm, a width We of the individual electrode 32 is 140 μm, a width B of a side wall 10*a*, which is a portion in which no pressure chamber 14 is formed, is 89 μm, and drive voltage applied to the individual electrodes 32 is 20 V, the widths Wc, We and B being lengths perpendicular to the longitudinal direction of each of the pressure chambers 14; and when a structural analysis according to the FEM is performed, the maximum displacement Dd (nm) varies with respect to the thickness Tv (μm) of the vibration plate 30 and the thickness Tp (μm) of the piezoelectric layer 31, as shown in FIG. 7.

Figure 7:
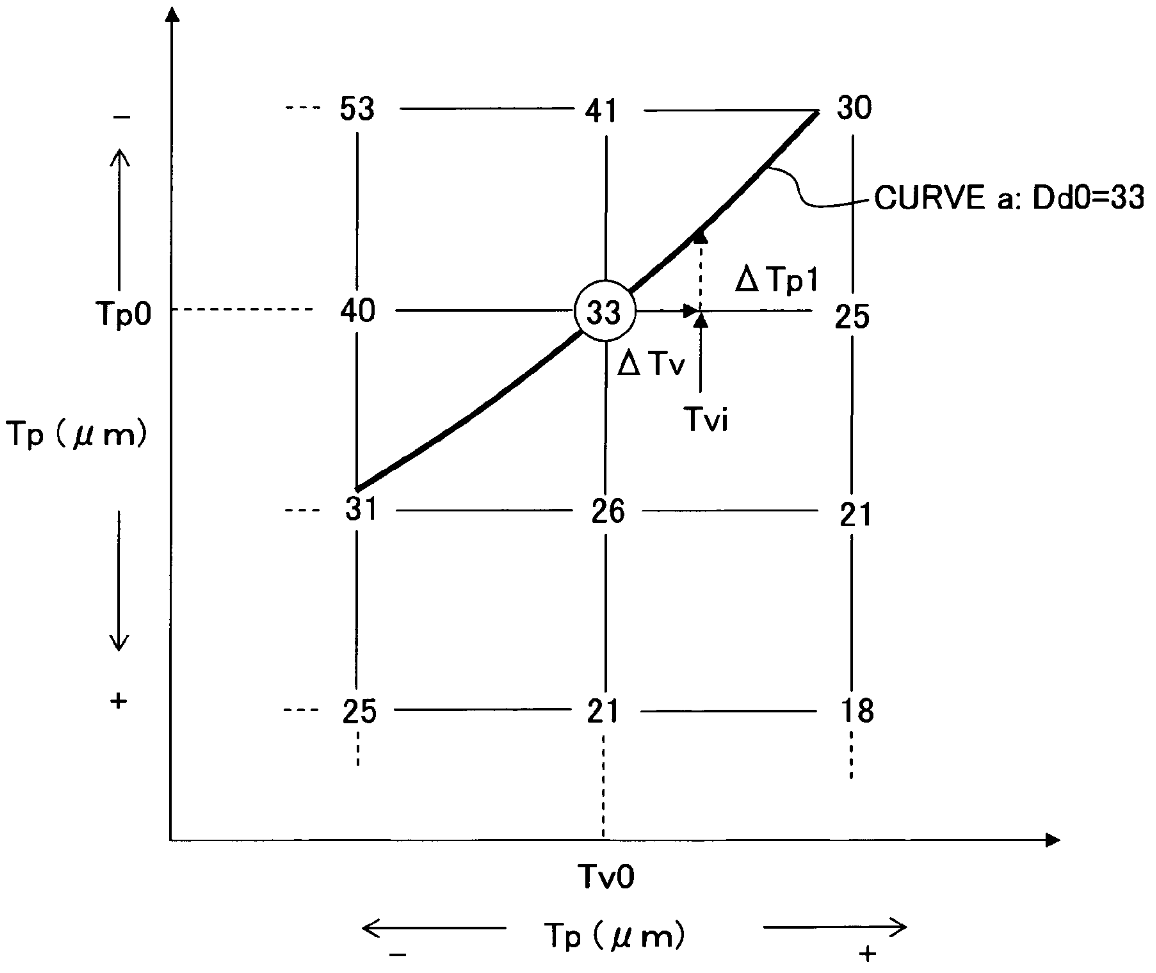
FIG. 7 is a diagram showing a relationship among a thickness Tv of the vibration plate, a thickness Tp of the piezoelectric layer and a maximum amount of displacement Dd of the vibration plate which represents the amount of deformation of the vibration plate.

The numerals in the graph of FIG. 7 represent values of the maximum amount of displacement Dd. As the value Tv along the axis of abscissa and the value Tp along the axis of ordinate are made to vary, the maximum amount of displacement Dd is the numeral written at the point of intersection of the values Tv and Tp. The curve "a" in FIG. 7 connects the points where the maximum displacement Dd is a preset target value Dd0 (Dd0=33). A correction amount ΔTp1 for the thickness of the piezoelectric layer 31 (a correction amount from a preset reference thickness Tp0 of the piezoelectric layer 31 with which the maximum amount of displacement DD is the target value Dd0 when the thickness Tv of the vibration plate 30 is the reference thickness Tv0) is determined, so that the maximum displacement Dd is the preset target value Dd0 (Dd0=33 in FIG. 7), the correction amount ΔTp1 being determined from the amount of deviation ΔTv of the actually measured thickness Tvi of the vibration plate 30 from a preset reference thickness Tv0 of the vibration plate 30 and the relationship among Dd and Tv and Tp as shown in FIG. 7. In FIG. 7, the value Tp below Tp0 along the axis of ordinate represents positive (plus) displacements. Accordingly, it is appreciated from the inclination of the curve in the graph that a lack of thickness of the vibration plate can be compensated for by the thickness of the piezoelectric layer.

In a case in which the vibration plate is formed of a material having an elastic modulus equal to or higher than that of the material for the piezoelectric layer (in this instance, the vibration plate is formed of stainless steel, and the piezoelectric layer is formed of lead zirconate titanate (PZT)), an analysis was performed according to the FEM, with the width Wc of pressure chamber 14, the width We of individual electrode 32, the width B of side wall 10*a*, the thickness Tv of the vibration plate 30, and the thickness Tp of the piezoelectric layer 31 were made to vary within practical ranges. From a result of this analysis, it is appreciated that, independent of the values of Wc, We, B, Tv and Tp, the correction amount ΔTp1 satisfies the conditions for the following expression (1):

$$(-0.75\times\Delta Tv)\leqq\Delta Tp1\leqq(-1.05\times\Delta Tv) \quad (1)$$

This relationship may be used to determine ΔTp1 from ΔTv. This makes it easy to obtain the correction amount ΔTp1 because there is no need to obtain in advance the relationship as shown in FIG. 7 for each combination of Wc, We, B, Tv and Tp.

When the vibration plates 30 vary in thickness among the piezoelectric actuators 3, the piezoelectric actuators 3 vary in rigidity. When the rigidity varies among the piezoelectric actuators 3 in this way, the amount of displacement of the piezoelectric actuators 3, due to a reaction force of the ink in the pressure chambers 14 against the pressure to the ink in the pressure chambers 14, vary among the piezoelectric actuators 3, which in turn causes volumes of ink droplets to be ejected from the nozzles 20 and velocities of the ink droplets to be ejected from the nozzles 20 vary among the ink-jet heads 1, thereby making the printing quality uneven among the ink-jet heads 1. In addition, the variation in the rigidity of the piezoelectric actuators 3 causes the velocity of propagation of pressure waves (i.e., the propagation time of pressure waves) in the pressure chambers 14 to vary among the actuators 3. In particular, there is a case where the propagation time of pressure waves deviates from a design value when the ink is discharged by a so-called "pulling ejection" in which the vibration plate 30 is deformed so as to project toward the pressure chambers 14 and then the deformed vibration plate 30 is restored to its original shape to increase the volume of the pressure chambers 14, thereby generating negative pressure waves, and then the vibration plate 30 is deformed again to project toward the pressure chambers 14 at a timing when the pressure waves turn positive, thereby generating high pressure in the ink. In this case, it is impossible to apply high pressure on the ink by deforming the vibration plate 30 to project toward the pressure chambers 14 at the timing when the pressure waves turn positive, and accordingly it is impossible to eject ink at correct timings, and causes unstable ejection of ink droplets, resulting in low printing quality. Therefore, the thickness of the piezoelectric layer 31 may be determined in the piezoelectric layer thickness determining step so that the rigidity of the actuator 3 is a preset value.

In this case, a structural analysis according to the FEM, and/or an experiment or the like is performed to obtain in advance the relationship among the thickness Tv of the vibration plate 30, the thickness Tp of the piezoelectric layer 31, and the maximum amount of displacement Di of the vibration plate 30 when a preset pressure is generated in pressure chambers 14 (the amount of displacement of the portion of the vibration plate 30 which faces the central portion of each of the pressure chambers 14). The maximum amount of displacement Di when the piezoelectric actuator 3 is driven corresponds to the rigidity of the actuator 3. An increase in the amount of displacement Di indicates a decrease in the rigidity of the piezoelectric actuator 3, which increases the propagation time of pressure waves. For example, in FIG. 5, when the width Wc of pressure chamber 14 is 250 μm, the width We of individual electrode 32 is 140 μm, the width B of side wall 10*a* is 89 μm, and the ink pressure generated in pressure chambers 14 is 0.1 MPa, and when a structural analysis according to the FEM is performed, the maximum amount of displacement Di (nm) varies with the thickness Tv (μm) of the vibration plate 30 and the thickness of Tp (μm) of the piezoelectric layer 31, as shown in FIG. 8.

Figure 8:
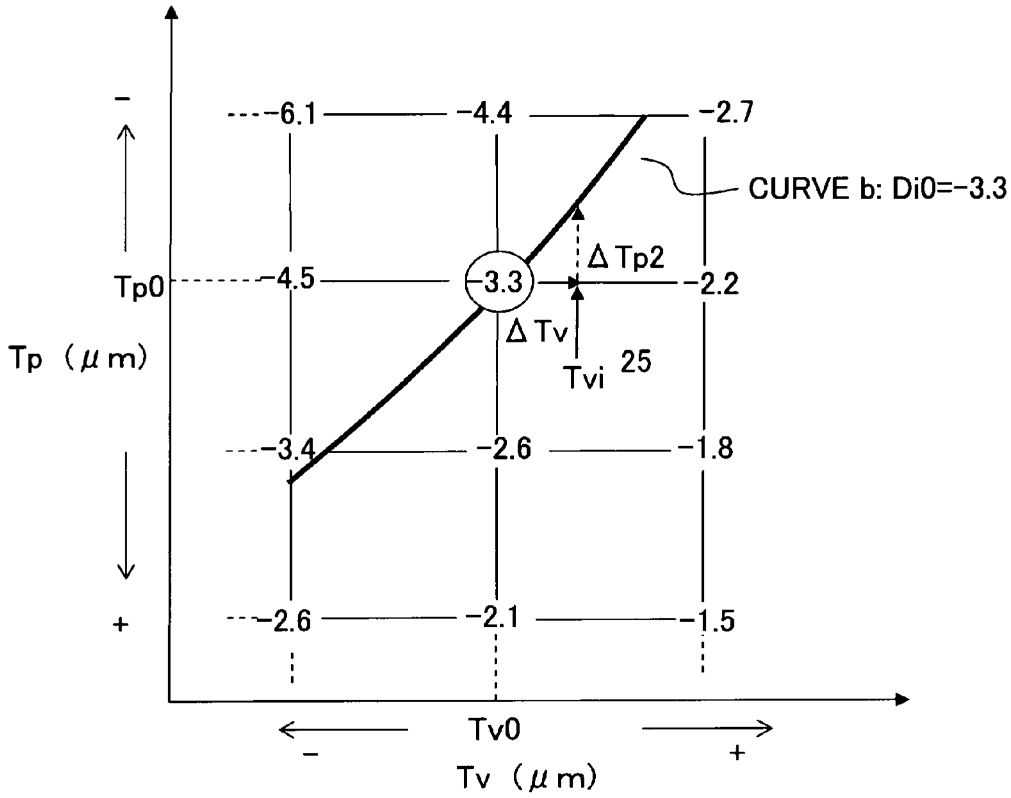
FIG. 8 is a diagram showing a relationship among the thickness Tv of the vibration plate, the thickness Tp of the piezoelectric layer and a maximum amount of displacement Di of the vibration plate which represents a rigidity of the piezoelectric actuator.

The numerals in the graph of FIG. 8 represent values of the maximum amount of displacement Di (the amount of displacement toward pressure chambers 14 is positive). As the value Tv along the axis of abscissa and the value Tp along the axis of ordinate are made to vary, the value Di is the numeral written at the point of intersection of the values Tv and Tp. The curve b in FIG. 8 connects the points where the value Di is a preset target value Di0 (Di0=−3.3). A correction amount ΔTp2 for the thickness of the piezoelectric layer 31 (a correction amount from a preset reference thickness Tp0 of the piezoelectric layer 31 with which the maximum amount of displacement Di is the target value Di0 when the thickness Tv of the vibration plate 30 is the reference thickness Tv0) is determined so that the maximum amount of displacement Di becomes the preset target value Di0 (Di0=−3.3 in FIG. 8), the correction amount ΔTp2 being determined from the amount of deviation ΔTv in the measured thickness Tvi of the vibration plate 30 from the preset reference thickness Tv0 of the vibration plate 30 and the relationship among Di and Tv and Tp as shown in FIG. 8. In FIG. 8, the value Tp below Tp0 along the axis of ordinate represents positive (plus) displacements. Accordingly, it is appreciated from the inclination of the curve in the graph that a lack of thickness of the vibration plate can be compensated for by the thickness of the piezoelectric layer.

In a case where the vibration plate is formed of a material having an elastic modulus equal to or higher than that of the material for the piezoelectric layer (in this instance, the vibration plate is formed of stainless steel, and the piezoelectric layer is formed of lead zirconate titanate (PZT)), an analysis was performed according to the FEM, in which the width Wc of pressure chamber 14, the width We of individual electrode 32, the width B of side wall 10*a*, the thickness Tv of the vibration plate 30 and the thickness Tp of the piezoelectric layer 31 are made to vary within practical ranges. From the result of this analysis, it is appreciated that, independent of the values of Wc, We, B, Tv and Tp, the correction amount ΔTp2 satisfies the relation of the following expression (2):

$$(-1.0\times\Delta Tv)\leqq\Delta Tp2\leqq(-1.3\times\Delta Tv) \quad (2)$$

This relationship may be used to determine ΔTp2 from ΔTv. This makes it easy to obtain the correction amount ΔTp2.

Figure 9:
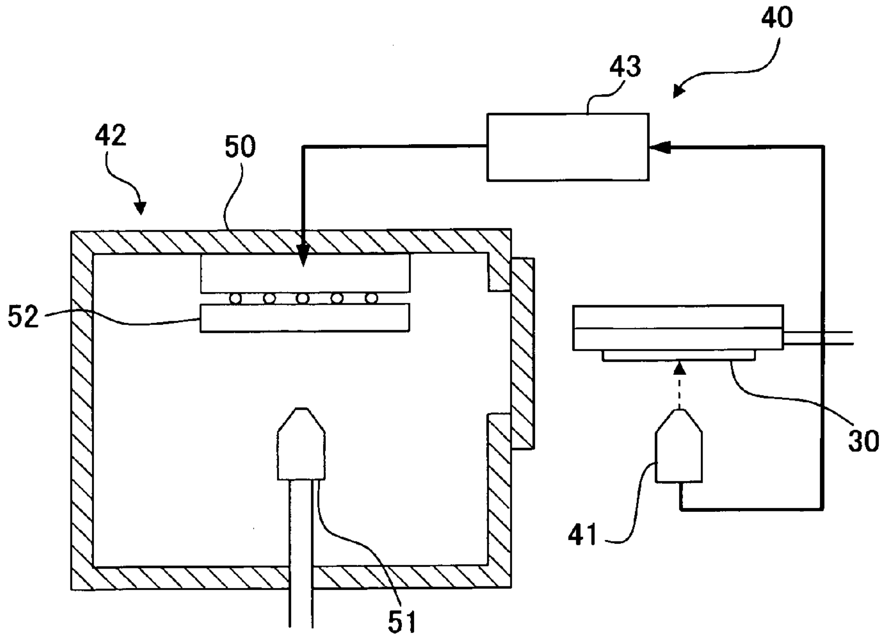
FIG. 9 is a diagram showing a step of measuring the thickness of the vibration plate in a case in which the piezoelectric layer is formed by the AD method.
Figure 10:
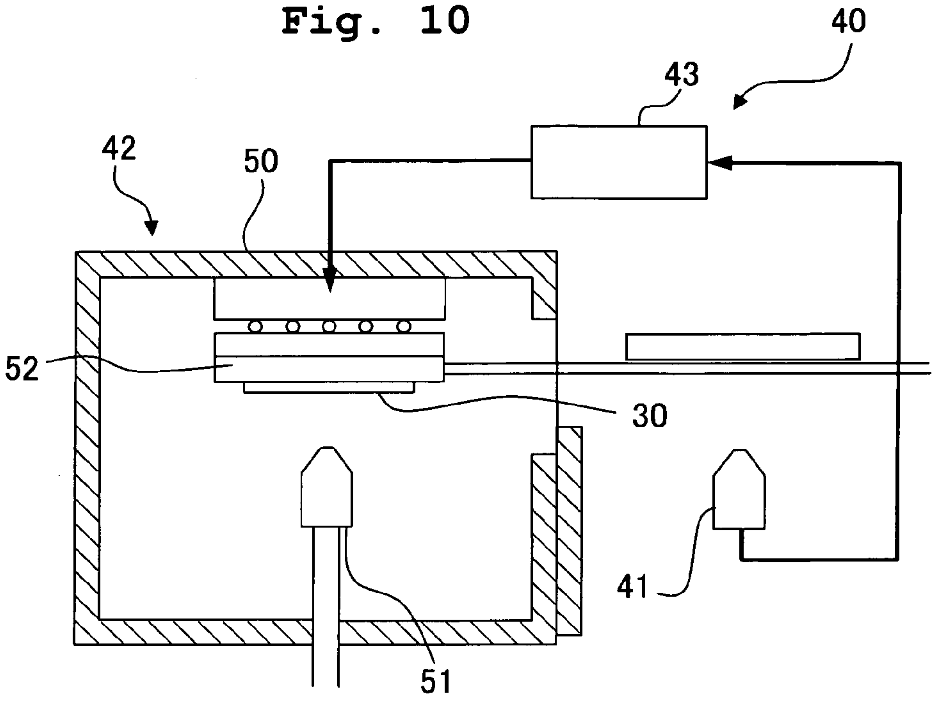
FIG. 10 is a diagram showing a state in which the vibration plate is attached to a stage in a film forming chamber.
Figure 11:
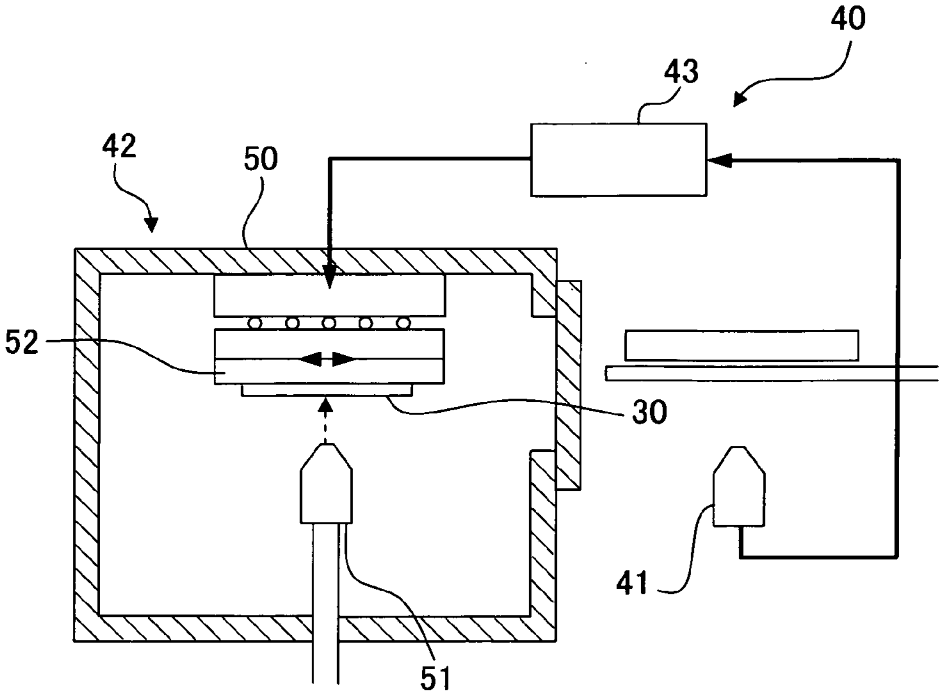
FIG. 11 is a diagram showing a state in which piezoelectric material is being ejected through an ejection nozzle onto the vibration plate.
Figure 12:
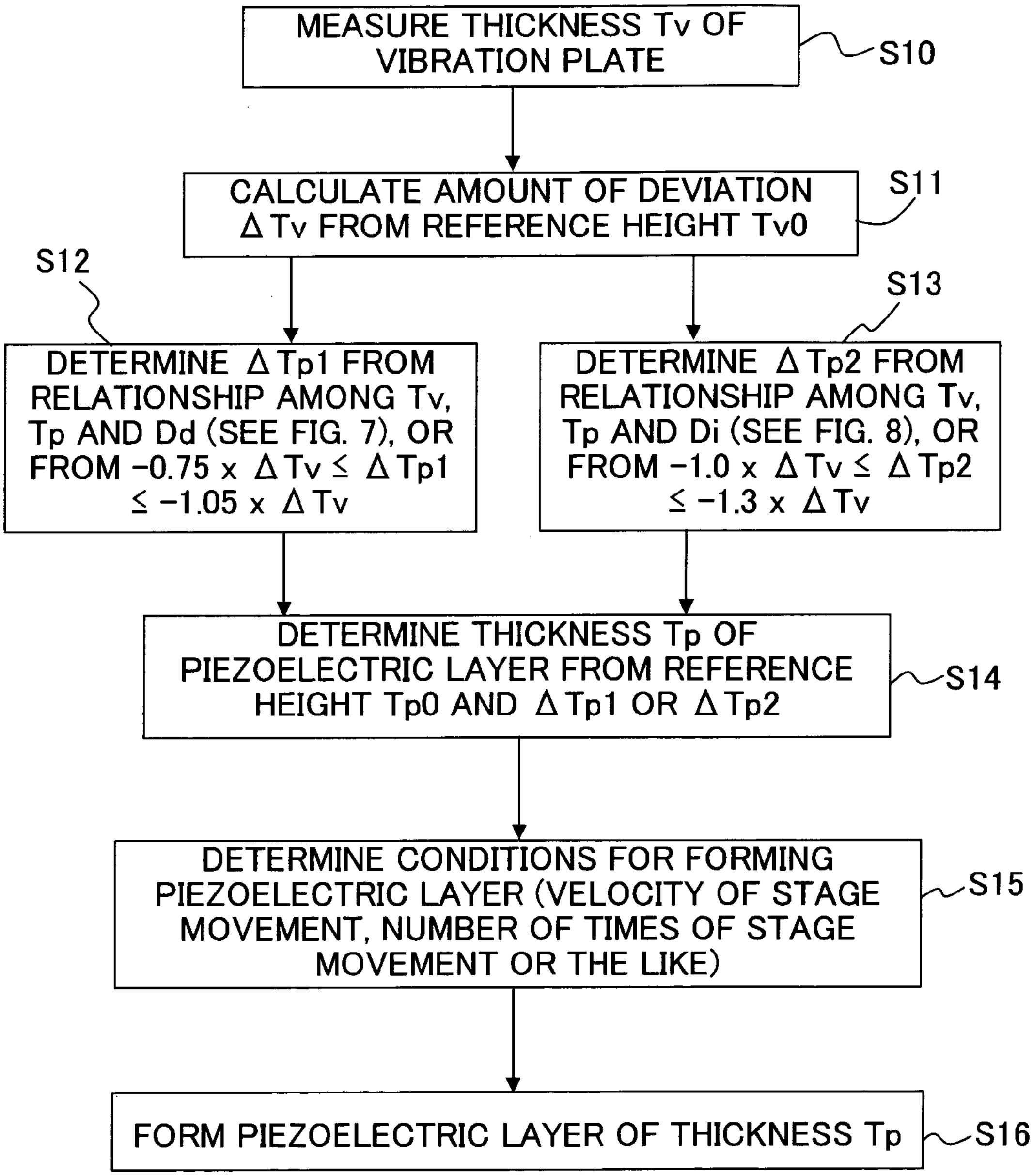
FIG. 12 is a flowchart of a series of steps for correcting the variation in thickness among vibration plates with the thickness of the piezoelectric layer.

With reference to FIGS. 9 to 11 and the flowchart of FIG. 12, a more detailed explanation will be given by illustrating, as an example, how to form a piezoelectric layer 31 by an aerosol deposition (AD) method, which is a method for blowing very small particles of piezoelectric material onto a substrate so that they impinge at a high velocity and are deposited on the substrate.

As shown in FIGS. 9 to 11, an apparatus 40 for manufacturing a piezoelectric actuator 3 includes a laser displacement gauge 41 (a thickness measuring unit), a film forming unit 42 (a piezoelectric layer forming unit) and a control unit 43 (a thickness determining unit). The laser displacement gauge 41 measures the thickness of a vibration plate 30. The film forming unit 42 forms a piezoelectric layer 31 on the vibration plate 30. Based on the thickness of a vibration plate 30 which is measured by the laser displacement gauge 41, the control unit 43 controls the thickness of a piezoelectric layer 31 to be formed by the film forming unit 42. The control unit 43 includes a storage unit or a storage section (not shown). The film forming unit 42 includes a film forming chamber 50, an ejection nozzle 51 and a stage 52. The ejection nozzle 51 is connected to an aerosol generator (not shown). The stage 52 moves the vibration plate 30 in a predetermined direction in the film forming chamber 50.

The aerosol generator generates aerosol, which is a mixture of ultrafine particles of piezoelectric material and a carrier gas, and ejects the aerosol through the ejection nozzle 51. The aerosol generator is constructed to generate aerosol of a preset particle concentration in accordance with a command from the control unit 43.

When a piezoelectric layer 31 is formed on a predetermined area of a vibration plate 30, the stage 52 moves the plate 30 relative to the ejection nozzle 51 so that the nozzle 51 through which the aerosol is ejected faces the whole of this area. The control unit 43 determines a path of relative movement of the stage 52 suitably depending on a desired area of film formation. The stage 52 moves along the determined path in accordance with a command from the control unit 43.

By using the manufacturing apparatus 40, the piezoelectric layer 31 is formed on the vibration plate 30 as follows. First, as shown in FIG. 9, the laser displacement gauge 41 measures the thickness Tv of the vibration plate 30 (S10 in FIG. 12) before the plate 30 joined to a cavity plate 10 is accommodated in the film forming chamber 50. The control unit 43 calculates the amount of deviation ΔTv of the measured thickness Tv of the vibration plate 30 from the reference thickness Tv0 (S11). The control unit 43 further calculates, a correction amount ΔTp1 (S12) from the amount of deviation ΔTv and the relationship (see FIG. 7) among thicknesses Tv and Tp and the maximum amount of displacement Dd, or from the above-mentioned range (−0.75×ΔTv)≦ΔTp1≦(−1.05×ΔTv), so that, with the correction amount ΔTp1, the amount of deformation of the vibration plate is a predetermined value.

Alternatively, The control unit 43 calculates a correction amount ΔTp2 (S13) for the thickness of the piezoelectric layer 31 from the amount of deviation ΔTv and the relationship (see FIG. 8) among thicknesses Tv and Tp and the maximum amount of displacement Di, or from the above-mentioned range (−1.0×ΔTv)≦ΔTp2≦(−1.3×ΔTv), so that with the correction value ΔTp2, the rigidity of the piezoelectric actuator 3 is a preset value.

The control unit 43 then determines the thickness Tp of the piezoelectric layer 31 from the reference thickness ΔTp0 and the correction amount ΔTp1 or ΔTp2 (S14). The control unit 43 further determines the conditions for the formation of the piezoelectric layer 31 of the determined thickness Tp (S15). The formation conditions include the number of times the stage 52 moves along the predetermined path and the velocity at which it moves. If the stage 52 moves oftener, the piezoelectric layer 31 can be thicker accordingly. If the stage 52 moves faster, the ejection nozzle 51 faces the desired area of film formation of the vibration plate 30 for a shorter time, so that the piezoelectric layer 31 can be thinner. Accordingly, it is possible to control the thickness of the piezoelectric layer 31, for example, as follows. In advance, the thickness of the piezoelectric layer 31 is measured, with the stage 52 moved various numbers of times at various velocities. The storage unit stores the relationship, as data, of the measured thickness of the piezoelectric layer 31 to the various numbers of times and various velocities. When a piezoelectric layer 31 is actually formed, the manufacturing apparatus 40 can be operated with the number of times and velocity of movement for the target thickness of the layer 31. It is preferable that the above-mentioned data and expressions (1) to (3) be stored in the storage unit of the control unit 43.

Then, as shown in FIG. 10, the vibration plate 30 is attached to the stage 52. Subsequently, as shown in FIG. 11, a piezoelectric layer 31 of thickness Tp is formed on the vibration plate 30 (S16) by moving the stage 52, to which the vibration plate 30 is attached, with the control unit 43 for the number of times determined at S15 and at the velocity determined at S15, while ejecting aerosol, which is generated by the aerosol generator, through the ejection nozzle 51 onto the vibration plate 30 in the film forming chamber 50 which is kept vacuum by a vacuum pump (not shown).

Alternatively, in the piezoelectric layer forming step with the manufacturing apparatus 40, a piezoelectric layer 31 of desired thickness may be formed by adjusting the particle concentration of aerosol, which is another condition for the formation of the layer 31. A higher particle concentration of aerosol results in the piezoelectric layer 31 being thicker. In this case also, it is preferable that the thicknesses of piezoelectric layers 31 be measured with the particle concentration of aerosol varied in a preliminary experiment, and that the relationship between the particle concentration and the thickness of the piezoelectric layer be obtained as data in advance and stored in the storage unit of the control unit 43. The thickness adjustment may be made by selecting at least one of the three conditions for the formation of the piezoelectric layer 31, which include the particle concentration of aerosol, the number of times of movement of the stage 52 and the velocity of movement of the stage 52, or by combining the three conditions.

The formation of a piezoelectric layer 31 by the AD method has been described hereinbefore as an example. However, it is possible to form a piezoelectric layer 31 of a predetermined thickness on a vibration plate 30 by another known method such as a sputtering method, a chemical vapor deposition (CVD) method or a hydrothermal synthesis method. In this case also, it is possible to form a piezoelectric layer 31 of desired thickness by controlling the sputtering time and voltage, the deposition time and temperature, or the like in conjunction with the thickness of the layer 31.

Figure 6C:
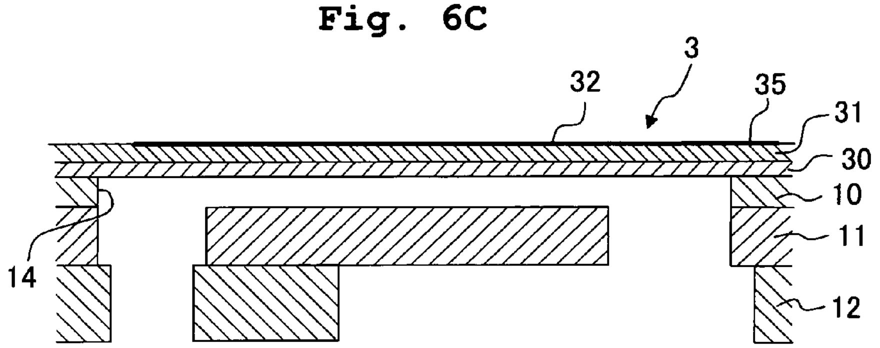
FIG. 6C shows a step of forming individual electrodes.
Figure 6D:
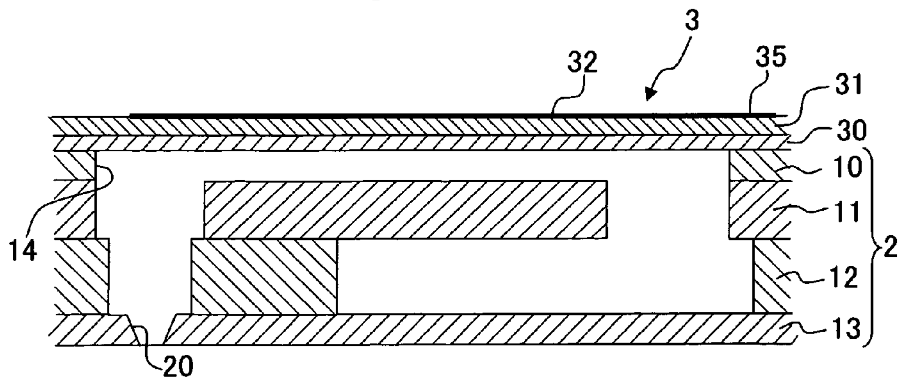
FIG. 6D shows a step of joining a nozzle plate, respectively in a process for manufacturing the ink-jet head.

After the piezoelectric layer 31 of the predetermined thickness is thus formed on a surface of the vibration plate 30 which is opposite to the pressure chambers 14, a plurality of individual electrodes 32 and a plurality of terminals 35 are formed at the same time on a surface of the piezoelectric layer 31 which is opposite to the vibration plate 30, as shown in FIG. 6C, by screen printing, a sputtering method, a vapor deposition method or another method. The thickness of the piezoelectric layer 31 may be measured after or while the piezoelectric layer 31 is formed. Finally, as shown in FIG. 6D, a nozzle plate 13 is joined to a manifold plate 12. This completes the process for manufacturing an ink-jet head 1.

When the nozzle plate 13 is a metal plate, the nozzle plate may be joined simultaneously with the other four metal plates (cavity plate 10, base plate 11, manifold plate 12 and vibration plate 30).

In the foregoing embodiment, the relationship of either of the expressions (1) and (2) may be used when the vibration plate is made of a material having an elastic modulus equal to or higher than that of the material for the piezoelectric layer. However, as will be understood, it is advantageous in terms of manufacture for the thickness of a piezoelectric layer which meets the expression (1) to also meet the expression (2). In other words, when the vibration plate is made of a material having an elastic modulus equal to or higher than that of the material for the piezoelectric layer, it is preferable in terms of the amount of deformation of the vibration plate and the rigidity of the actuator that the thickness of the piezoelectric layer be adjusted so as to meet the following expression (3):

$$(-1.0\times\Delta Tv)\leqq\Delta Tp1\leqq(-1.05\times\Delta Tv) \quad (3)$$

With attention given to the expression (3), the following essential result can be brought. It is evident that the thicknesses of the piezoelectric layer and vibration plate are complementary to each other. In other words, when the vibration plate is thicker than its reference value by the error ΔTv, only a value (ΔTv≈ΔTp1) roughly equal to the error ΔTv needs to be subtracted from the reference thickness Tp0 of the piezoelectric layer. Accordingly, it is possible to provide a thickness setting process as follows. In advance, a design value TT0 (=Tp0+Tv0) for the sum of the design values for the vibration plate is obtained from them. First, the thickness of the vibration plate is measured, and the amount of deviation ΔTv in the measured thickness from the reference value Tv0 is obtained. Since it is necessary to maintain the design value TT0 for the sum according to the expression (3), the thickness of the piezoelectric layer is set so as to be (Tp0−ΔTv). Accordingly, only by measuring the thickness error of the vibration plate, it is possible to use the measured error directly as a correction value for the thickness of the piezoelectric layer. This makes the piezoelectric layer thickness setting step very simple.

The relationships of the expressions (1) to (3) are held only when the material for the vibration plate is, in particular, metal, silicon (Si), metallic oxide or silicon oxide and has an elastic modulus or Young's modulus equal to or higher than that of the piezoelectric layer. For example, if the PZT of the material for the piezoelectric layer has an elastic modulus of 70 GPa (7,000 $Kg/mm^2$), the vibration plate can be formed of aluminum (70 GPa), stainless steel (180 GPa), copper (130 GPa), titanium (120 GPa), nickel (210 GPa), alumina (300 GPa) or silicon (130 to 190 GPa depending on the crystal orientation). A resin such as polyimide cannot be used as the material for the vibration plate because it has a low elastic modulus of 7 GPa.

The method described above for manufacturing an ink-jet head 1 can achieve the following effects.

The thickness of the vibration plate 30 is measured, and a suitable thickness is determined for the piezoelectric layer 31 based on the amount of deviation, from a reference thickness, of the measured thickness of the vibration plate 30. Accordingly, even when the thickness of the vibration plate 30 deviates from the reference thickness, the deviation can be corrected with the thickness of the piezoelectric layer 31. This improves the yield in the manufacturing process.

When the thickness of the piezoelectric layer 31 is determined in the piezoelectric layer thickness determining step so that the amount of deformation of the vibration plate 30 is the preset amount of deformation, it is possible to suppress as much as possible the variation in deformation among the vibration plates 30 of piezoelectric actuators 3 (i.e., the variation in volume among droplets) due to the variation in thickness among the plates 30. When the thickness of the piezoelectric layer 31 is determined so that the rigidity of the piezoelectric actuator 3 is the preset value, it is possible to suppress as much as possible the variation in rigidity among the piezoelectric actuators 3 due to the variation in thickness among the vibration plate 30 of the actuators. This enables ink-jet heads 1 to discharge ink droplets of equal volume through their nozzles 20. This also enables all ink-jet heads 1 to discharge ink stably. Accordingly, it is possible to reduce the variation in the ink ejection characteristics among the ink-jet heads 1.

When the piezoelectric layer 31 is formed by the AD method or another method for depositing particles or molecules of piezoelectric material on the vibration plate 30, it is possible to finely adjust the thickness of the piezoelectric layer 31. Accordingly, after determining the thickness Tp of the piezoelectric layer 31 in the piezoelectric layer thickness determining step, it is easy to form the layer 31 of thickness Tp. This makes it possible to keep mass-producing ink-jet heads 1 having equal ink ejection characteristics even when the vibration plates 30 vary in thickness during the production of the ink-jet heads 1. As a result, the manufacturing cost can be reduced.

In the ink-jet head 1 according to this embodiment, the vibration plate 30, which is formed of metallic material so as to be electrically conductive, serves also as the common electrode. The piezoelectric layer 31 is formed directly on the surface of the vibration plate 30 which is opposite to the pressure chambers 14, without intervening another layer (for example, a common electrode layer or an insulation material layer which insulates the electrode and the vibration plate 30 from each other) between the piezoelectric layer 31 and the vibration plate 30. This makes it possible to accurately correct the thickness variation among the vibration plates 30 only by adjusting the thickness of the piezoelectric layer 31. Because the vibration plate 30 serves also as the common electrode, it is possible to omit the step of forming a common electrode separately from the vibration plate 30. This simplifies the manufacturing process.

Next, explanations will be provided about modified embodiments in which various changes are added to the above-mentioned embodiment. The elements or components of the modified embodiments which are similar in structure to those in the foregoing embodiment will be assigned the same reference numerals and any explanation therefor will be appropriately omitted.

First Modified Embodiment

The method for manufacturing an ink-jet head according to the foregoing embodiment includes the step of forming a piezoelectric layer 31 by depositing particles of piezoelectric material on the vibration plate 30 by the AD method or the like. Alternatively, a piezoelectric layer 31 may be formed by bonding, to a vibration plate 30, one or more piezoelectric sheets obtained by calcining one or more green sheets of PZT. In this case, piezoelectric sheets of different thicknesses are prepared in advance, and then the thickness of the piezoelectric layer 31 is set to a predetermined value based on the amount of deviation $\Delta Tv$ in the thickness of the vibration plate 30, and subsequently one or more piezoelectric sheets of suitable thickness may be selected to be bonded to the vibration plate 30 so that the thickness of the piezoelectric layer 31 is the determined value.

Second Modified Embodiment

Figure 13:
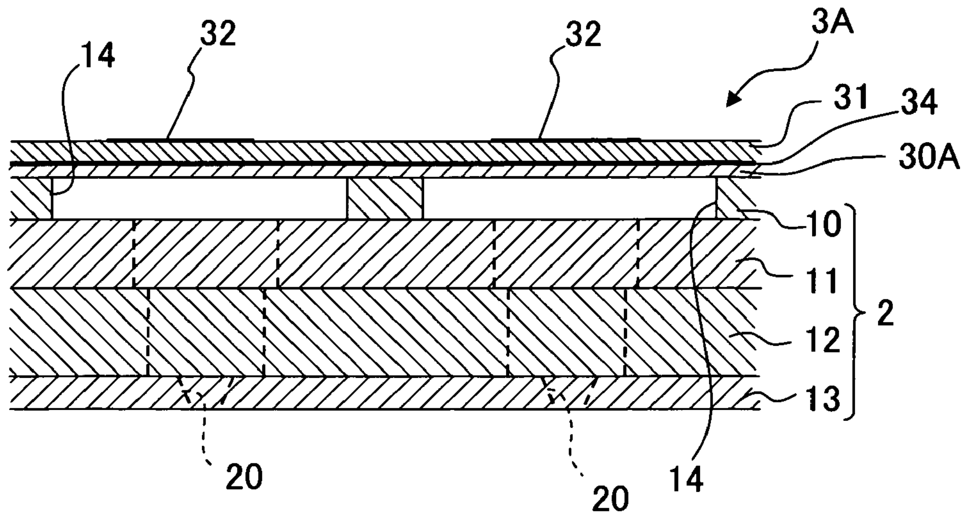
FIG. 13 is a sectional view showing a modified embodiment corresponding to FIG. 5.

The vibration plate may be made of an insulation material (such as a silicon material the surface of which is oxidized, PZT, alumina, zirconia or other ceramic material, or polyimide or other synthetic resin material). In this case, as shown in FIG. 13, the piezoelectric actuator 3A needs to include a common electrode 34 which is disposed on the surface of the insulative vibration plate 30A opposite to the pressure chambers 14 and which faces the individual electrodes 32 to generate an electric field in the portion of the piezoelectric layer 31 sandwiched between the electrode 34 and each of the electrodes 32.

Third Modified Embodiment

Figure 14:
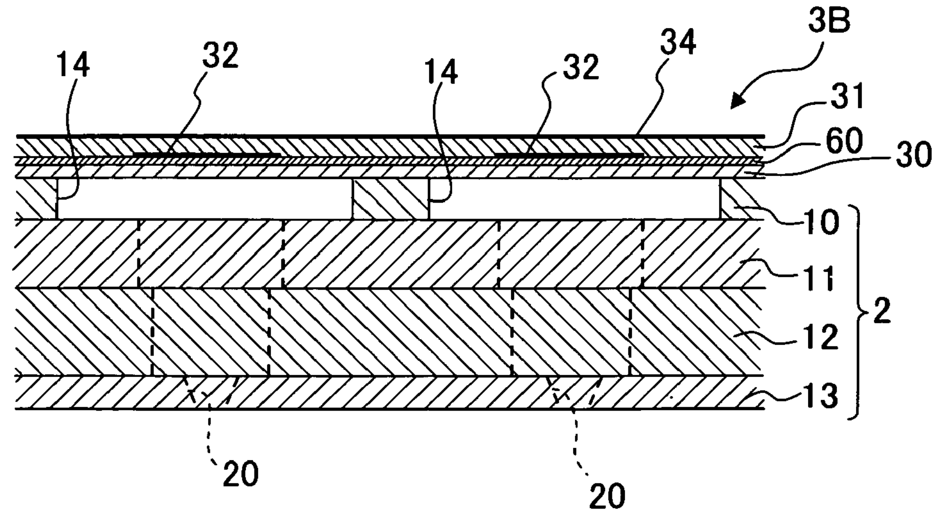
FIG. 14 is a sectional view showing another modified embodiment corresponding to FIG. 5.
Figure 15:
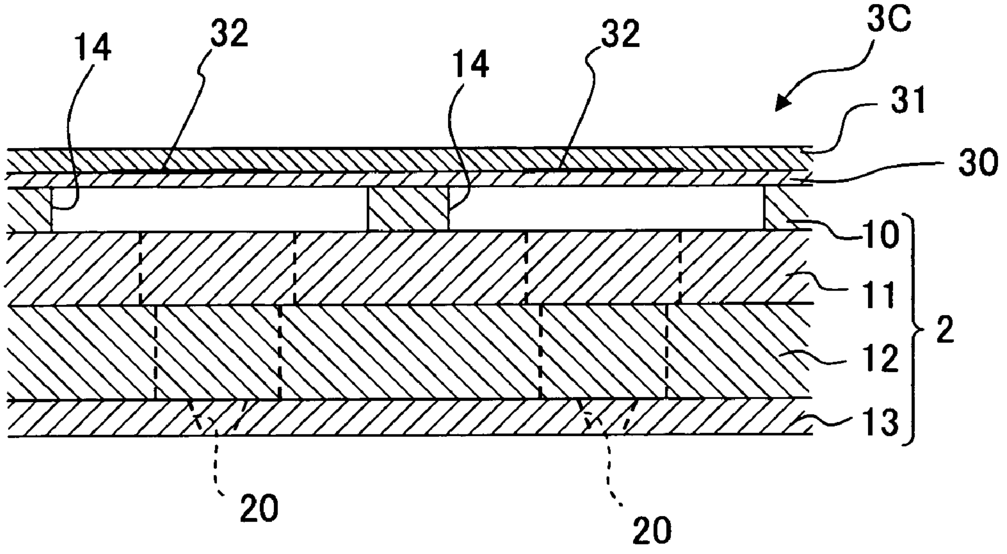
FIG. 15 is a sectional view showing still another modified embodiment corresponding to FIG. 5.

In the foregoing embodiment, the individual electrodes 32 are formed on the surface of the piezoelectric layer 31 which is opposite to the vibration plate 30. Alternatively, the individual electrodes 32 may be arranged on a surface of the piezoelectric layer 31 at the side of the vibration plate 30, and common electrode 34 may be arranged on the surface of the piezoelectric layer 31 opposite to the vibration plate 30. In this case, however, when the vibration plate 30 is made of metallic material, the surface of the vibration plate 30 on which the individual electrodes 32 are to be arranged, needs to be insulative so as to insulate the individual electrodes 32 from each other. Therefore, as shown in FIG. 14, the piezoelectric actuator 3B needs to include an insulation material layer 60 formed on the upper surface (the surface opposite to pressure chambers 14) of the metallic vibration plate 30. The insulation material layer 60 may be formed, for example, of alumina, zirconia or other ceramic material by the AD method, the sputtering method, the CVD method or the sol-gel method. On the other hand, when the vibration plate is made of insulation material such as silicon material, ceramic material or synthetic resin material, as shown in FIG. 15, the individual electrodes 32 may be arranged directly on the upper surface of the vibration plate 30C in the piezoelectric actuator 3C. The insulative vibration plate 30C insulates the individual electrodes 32 from each other.

Fourth Modified Embodiment

In the foregoing embodiment, although the channel unit, which has individual ink channels 21 formed in the ink channel, is constructed mainly of laminated metallic plates (cavity plate 10, base plate 11 and manifold plate 12), the ink channel 2 may be formed of material other than metallic material (for example, silicon material).

The foregoing embodiment and the modified embodiments are examples of the application of the present invention to ink-jet heads which transport ink. However, the liquid transporting apparatuses, to which the present invention is applicable, are not limited to ink-jet heads. For example, the present invention can also be applied to a liquid transporting apparatus which transports a liquid such as a medicinal solution or a biochemical solution inside a micro total-analyzing system (μTAS), a liquid transporting apparatus which transports a liquid such as a solvent and a chemical solution inside a micro chemical system, and a liquid transporting apparatus which transports a liquid other than ink.

What is claimed is:

1. A method for manufacturing a piezoelectric actuator for a liquid transporting apparatus, the piezoelectric actuator being provided on a surface of a channel unit having a pressure chamber, the piezoelectric actuator including a vibration plate covering the pressure chamber, a piezoelectric layer positioned on a side of the vibration plate which is opposite to the pressure chamber, and two electrodes positioned on both sides of the piezoelectric layer respectively to sandwich the piezoelectric layer therebetween, the method comprising:

a vibration plate thickness measuring step for measuring a thickness of the vibration plate;

a piezoelectric layer thickness determining step for determining a thickness of the piezoelectric layer based on an amount of deviation in the thickness of the vibration plate, measured in the vibration plate thickness measuring step, from a preset reference thickness of the vibration plate; and a piezoelectric layer forming step for providing the piezoelectric layer determined in the piezoelectric layer thickness determining step on the side of the vibration plate which is opposite to the pressure chamber.

2. The method for manufacturing the piezoelectric actuator according to claim 1, wherein the thickness of the piezoelectric layer is determined, in the piezoelectric layer thickness determining step, so that an amount of deformation of the vibration plate when a preset voltage is applied to one of the electrodes is a preset amount of deformation.

3. The method for manufacturing the piezoelectric actuator according to claim 2, wherein the vibration plate is made of a material having an elastic modulus equal to or higher than that of a material for the piezoelectric layer; and that, when the amount of deviation in the thickness of the vibration plate is $\Delta Tv$, and a correction amount with respect to a preset reference thickness of the piezoelectric layer is $\Delta Tp1$, the correction amount $\Delta Tp1$ is determined within a range of $(-0.75\times\Delta Tv)\leqq\Delta Tp1\leqq(-1.05\times\Delta Tv)$ in the piezoelectric layer thickness determining step.

4. The method for manufacturing the piezoelectric actuator according to claim 1, wherein the thickness of the piezoelectric layer is determined in the piezoelectric layer thickness determining step so that a rigidity of the actuator is a preset value.

5. The method for manufacturing the piezoelectric actuator according to claim 4, wherein the vibration plate is made of a material having an elastic modulus equal to or higher than that of a material for the piezoelectric layer, and that, when the amount of deviation in the thickness of the vibration plate is $\Delta Tv$ and a correction amount with respect to a preset reference thickness of the piezoelectric layer is $\Delta Tp2$, the correction amount $\Delta Tp2$ is determined within a range of $(-1.0\times\Delta Tv)\leqq\Delta Tp2\leqq(-1.3\times\Delta Tv)$ in the piezoelectric layer thickness determining step.

6. The method for manufacturing the piezoelectric actuator according to claim 3, wherein when the amount of deviation in the thickness of the vibration plate is $\Delta Tv$ and the correction amount with respect to the preset reference thickness of the piezoelectric layer is $\Delta Tp1$, the correction amount $\Delta Tp1$ is determined within a range of $(-1.0\times\Delta Tv)\leqq\Delta Tp1\leqq(-1.05\times\Delta Tv)$ in the piezoelectric layer thickness determining step.

7. The method for manufacturing the piezoelectric actuator according to claim 1, wherein:

the vibration plate is formed of an electrically conductive material and serves as one of the two electrodes;

the piezoelectric layer is formed to make contact with a surface of the vibration plate which is opposite to the pressure chamber in the piezoelectric layer forming step; and the other of the two electrodes is formed to make contact with a surface of the piezoelectric layer which is opposite to the vibration plate.

8. The method for manufacturing the piezoelectric actuator according to claim 1, wherein the piezoelectric layer is formed on the vibration plate by one method selected from the group consisting of an aerosol deposition method, a sputtering method and a chemical vapor deposition method in the piezoelectric layer forming step.

9. The method for manufacturing the piezoelectric actuator according to claim 1, wherein the piezoelectric layer is formed on the vibration plate by an aerosol deposition method.

10. A method for manufacturing a piezoelectric actuator provided on a surface of a channel unit having a pressure chamber, the piezoelectric actuator including a vibration plate covering the pressure chamber, a piezoelectric layer positioned on a side of the vibration plate opposite to the pressure chamber, and two electrodes positioned on both sides of the piezoelectric layer respectively to sandwich the piezoelectric layer therebetween, the vibration plate being made of a material having an elastic modulus equal to or higher than that of a material for the piezoelectric layer, the method comprising:

a step for obtaining a sum of a design value for a thickness of the vibration plate and a design value for a thickness of the piezoelectric layer;

a measuring step for measuring the thickness of the vibration plate;

a step for determining the thickness of the piezoelectric layer so that the sum is maintained with respect to the measured thickness of the vibration plate; and a piezoelectric layer forming step for providing the piezoelectric layer on the side of the vibration plate which is opposite to the pressure chamber based on the step for determining the thickness of the piezoelectric layer.

11. A method for manufacturing a liquid transporting apparatus provided with a channel unit having a pressure chamber, and a piezoelectric actuator which is provided on a surface of the channel unit and which includes a vibration plate covering the pressure chamber, a piezoelectric layer positioned on a side of the vibration plate opposite to the pressure chamber, and two electrodes positioned on both sides of the piezoelectric layer respectively, the method comprising:

a vibration plate thickness measuring step for measuring a thickness of the vibration plate;

a piezoelectric layer thickness determining step for determining a thickness of the piezoelectric layer based on an amount of deviation in the thickness of the vibration plate, measured at the vibration plate thickness measuring step, from a preset reference thickness of the vibration plate; and a piezoelectric layer forming step for providing the piezoelectric layer determined in the piezoelectric layer thickness determining step on the side of the vibration plate which is opposite to the pressure chamber.

12. The method for manufacturing the liquid transporting apparatus according to claim 11, wherein the thickness of the piezoelectric layer is determined in the piezoelectric layer thickness determining step so that an amount of deformation of the vibration plate when a preset voltage is applied to one of the electrodes is a preset amount of deformation.

13. The method for manufacturing the liquid transporting apparatus according to claim 12, wherein the vibration plate is made of a material having an elastic modulus equal to or higher than that of a material for the piezoelectric layer; and that, when the amount of deviation in the thickness of the vibration plate is ΔTv and a correction amount with respect to a preset reference thickness of the piezoelectric layer is ΔTp1, the correction amount ΔTp1 is determined within a range of $(-0.75\times\Delta Tv)\leqq\Delta Tp1\leqq(-1.05\times\Delta Tv)$ in the piezoelectric layer thickness determining step.

14. The method for manufacturing the liquid transporting apparatus according to claim 11, wherein the thickness of the piezoelectric layer is determined in the piezoelectric layer thickness determining step so that a rigidity of the actuator is a preset value.

15. The method for manufacturing the liquid transporting apparatus according to claim 14, wherein the vibration plate is made of a material having an elastic modulus equal to or higher than that of a material for the piezoelectric layer; and that, when the amount of deviation in the thickness of the vibration plate is ΔTv and a correction amount with respect to a preset reference thickness of the piezoelectric layer is ΔTp2, the correction amount ΔTp2 is determined within a range of $(-1.0\times\Delta Tv)\leqq\Delta Tp2\leqq(-1.3\times\Delta Tv)$ in the piezoelectric layer thickness determining step.

16. The method for manufacturing the liquid transporting apparatus according to claim 13, wherein when the amount of deviation in the thickness of the vibration plate is ΔTv and the correction amount with respect to the preset reference thickness of the piezoelectric layer is ΔTp1, the correction amount ΔTp1 is determined within a range of $(-1.0\times\Delta Tv)\leqq\Delta Tp1\leqq(-1.05\times\Delta Tv)$ in the piezoelectric layer thickness determining step.

17. The method for manufacturing the liquid transporting apparatus according to claim 11 wherein:

the vibration plate is formed of an electrically conductive material and serves as one of the two electrodes;

the piezoelectric layer is formed to make contact with a surface of the vibration plate which is opposite to the pressure chamber in the piezoelectric layer forming step; and the other of the two electrodes is formed to make contact with a surface of the piezoelectric layer which is opposite to the vibration plate.

18. The method for manufacturing the liquid transporting apparatus according to claim 11, wherein the piezoelectric layer is formed on the vibration plate by one method selected from the group consisting of an aerosol deposition method, a sputtering method and a chemical vapor deposition method in the piezoelectric layer forming step.

19. The method for manufacturing the liquid transporting apparatus according to claim 11, wherein the piezoelectric layer is formed on the vibration plate by an aerosol deposition method.

* * * * *